United States Patent Office 3,677,902
Patented July 18, 1972

3,677,902
PREPARATION OF AMYLOGLUCOSIDASE
Knud Aunstrup, Hvidovre, Denmark, assignor to Novo Terapeutisk Laboratorium A/S, Copenhagen, Denmark
No Drawing. Filed June 21, 1966, Ser. No. 559,085
Claims priority, application Great Britain, July 7, 1965, 28,903/65
Int. Cl. C12d 13/10
U.S. Cl. 195—66 R
4 Claims

ABSTRACT OF THE DISCLOSURE

A process of producing amyloglucosidase free of any detectable amounts of transglucosidase wherein a strain of *Aspergillus niger* v. Tieghem selected from the group CBS No. 262.65, CBS No. 263.65 and CBS No. 103.66 or a natural or artificial mutant or variant thereof is subjected to submerged growth in a nutrient medium.

---

It is well-known to replace the conventional acid hydrolysis of starch by an enzymatic decomposition. In particular, such enzymatic process has been employed in the preparation of crystalline dextrose. It is of considerable importance that the conversion to dextrose is carried as far as possible, because the non-hydrolyzed dextrin inhibits the crystallisation of dextrose and lowers the yield thereof.

Amyloglucosidase has been employed as the active enzyme for decomposing the starch. This enzyme is able to bring about a complete decomposition of starch to dextrose, although $\alpha$-1,6-glucosidic bonds are split considerably slower than $\alpha$-1,4-glucosidic bonds. However, many microorganisms which are able to produce amyloglucosidase, also produce the transferase called transglucosidase which is active in transferring dextrose molecules from $\alpha$-1,4-bonds to $\alpha$-1,6-bonds; with maltose, as an example, this effect results in the production of isomaltose and other oligosaccharides.

An enzymatic hydrolysis of starch has been carried out using enzymes originating from Rhizopus sp., *Endomyces fibuliger*, and Aspergillus sp. Rhizopus sp. forms a pure amyloglucosidase but has to be grown in surface cultures which is not attractive for industrial production of amyloglucosidase due to the high costs of labour inherent to this process. *Endomyces fibuliger* may be used in submerged growth operations but does not provide commercial yields of amyloglucosidase.

Aspergillus sp. are well suited for the production of amyloglucosidase on a commercial scale by submerged growth. However, in addition to amyloglucosidase all of the known Aspergillus sp. produce more or less transglucosidase. For the reasons mentioned above it is highly desirable to remove the latter enzyme from the enzyme preparation obtained before employing it in the hydrolysis of starch with the object of preparing dextrose, and several chemical methods have been suggested for removing the transglucosidase in order to obtain a pure amyloglucosidase preparation.

In contradistinction to the above described universally accepted state of the art in the present particular field I have now found strains of *Aspergillus niger* which are able to produce amyloglucosidase in commercial yields without production of any detectable amount of transglucosidase (as defined hereinafter), and that by mutation of such strains the yield of amyloglucosidase can be materially increased without simultaneous production of transglucosidase.

I have also found that it is not absolutely necessary to alter the cultivation conditions employed in the prior art for the production of amyloglucosidase by cultivation of Aspergillus sp.

Thus, in accordance with the present invention amyloglucosidase suitable for decomposition of starch to dextrose is produced by subjecting a strain of *Aspergillus niger* showing no detectable production of transglucosidase (as defined hereinafter) to submerged growth in a nutrient medium.

In particular, strains falling within the species *Aspergillus niger* v. Tieghem have been found to be especially useful in the production of transglucosidase-free amyloglucosidase. Among the latter strains I have found that the *Aspergillus niger* strains CBS Nos. 262.65, 263.65, 103.66 as well as natural and artificial mutants or variants thereof are particularly suitable for producing large yields of amyloglucosidase containing no detectable amounts of

MORPHOLOGY CHARACTERISTICS

| Strain CBS Number | | 262.65 | 263.65 | 103.66 |
|---|---|---|---|---|
| Colony characters | Rate of growth, colony diameter after 5 days, mm. | 20-25 | 20-25 | 20-25. |
| | Texture | Smooth, few wrinkles, conidiophores not crowded. | Smooth, few wrinkles, conidiophores not crowded. | Smooth, edge irregular, conidiophores not crowded. |
| Mycelium | Submerged | Yes | Yes | Yes. |
| | Floccose | Scant | Scant | Scant. |
| | Colour above | Center dark brown, edge light yellow. | Light yellow to cinnamon, edge light yellow. | Light yellow to brown. |
| | Colour reverse | Light yellow | Light yellow | Sulphur yellow. |
| Heads | Colour | Brown | Light yellow to cinnamon | Dark brown. |
| | Shape | Globose | Globose | Globose. |
| | Diameter, $\mu$ | 120-180 | 90-180 | About 110. |
| Conidiophores | Length, $\mu$ | 400-700 | 500-900 | 500-800. |
| | Diameter, $\mu$ | 7-11 | 7-10 | 7-11. |
| | Wall thickness, $\mu$ | 1-2 | 1-2 | 1-2. |
| | Wall markings | Smooth | Smooth | Smooth. |
| Vesicles | Shape | Globose | Globose | Globose. |
| | Diameter, $\mu$ | 27-45 | 25-40 | 25-35. |
| Primary Sterigmata | Dimensions, $\mu$ | 18-27$\times$4-10 | 18-27$\times$4-10 | 9-11$\times$4-5. |
| | Arrangement | Fertile over whole area | Fertile over whole area | Fertile over whole area. |
| Secondary Sterigmata | Dimensions, $\mu$ | 8-14$\times$2-3,5 | 7-12$\times$2-3,5 | 7-11$\times$2. |
| Conidia | Shape | Globose | Globose | Globose. |
| | Colour | Brown | Light yellow to cinnamon. | Brown. |
| | Diameter, $\mu$ | 3-5 | 3-5 | 3-5. |
| | Markings | Rough | Rough | Rough. |
| Peritecia ascospores sclerotia. | | Absent | Absent | Absent. | transglucosidase when subjected to submerged growth in a nutrient medium.

The above strains which are denoted by means of CBS-numbers are mutants of a strain which was isolated from a soil specimen collected in Copenhagen in December, 1963.

The strains CBS Nos. 262.65 and 263.65 have been identified at the Centraalbureau voor Schimmelcultures, Baarn, Holland, as falling within the species *Aspergillus niger* v. Tieghem and *Aspergillus niger* v. Tieghem mut. schiemanni (Schiemann) Thom et Raper, respectively. The strain CBS No. 103.66 is apparently a degenerate mutant of *Aspergillus niger* v. Tieghem.

Samples of the strains CBS Nos. 262.65, 263.65 and 103.66 are on deposit as restricted cultures at the Centraalbureau voor Schimmelcultures.

In the above table a morphological description of the above three strains is given (growth on Czapek Dox agar; incubation temperature (30° C.).

The present method of preparing amyloglucosidase, containing no detectable amounts of transglucosidase, is described in more detail in the following:

The fungus is stored in lyophilized form. It is lyophilized from Czapek Dox agar the composition of which is stated in the following. The lyophilization substrate is milk. The lyophilized culture is inoculated on a Fernbach flask with Czapek Dox agar and incubated at 30° C. until sporulation takes place. The spores are suspended in sterile water and transferred aseptically to an inoculation tank of 100 liters, containing a medium of ground corn (20–25%) and $KNO_3$ (1%). Stirring (200–400 r.p.m.) and aeration (1 vol. per vol. per min.) are started, and the fermentation is carried out at 30° C. until there is a good growth in the tank. The tank contents are transferred to a main fermentation tank (2000 liters) containing a medium of the same composition as the inoculation tank contents. Stirring (100–200 r.p.m.) and aeration (1 vol. per vol. per min) are started, and the fermentation is carried out at 30° C. until the enzyme content is maximum. The pH during the fermentation is 4 to 5. Supplementary medium may be added during fermentation. The culture liquid is then freed of fungus mycelium by filtration or centrifugation. If desired, the liquid may be concentrated in vacuo, and preserving agents such as sodium chloride or benzoic acid may be added.

If a solid product is desired the amyloglucosidase may be precipitated with alcohol or acetone to which kieselguhr has been added in order to avoid a sticky precipitate.

In the above process the Czapek Dox agar may be replaced by e.g. E-agar. The two media have the following compositions:

| Czapek Dox agar | | E-substrate | |
|---|---|---|---|
| G. per litre: | | G. per litre: | |
| $NaNO_3$ | 3 | Peptone | 6 |
| $K_2HPO_4$ | 1 | Trypsin digested casein. | 4 |
| $MgSO_4, 7H_2O$ | 0.5 | Yeast extract | 3 |
| KCl | 0.5 | Glucose | 1 |
| $FeSO_4, 7H_2O$ | 0.01 | Meat extract | 1.5 |
| Saccharose | 30 | Malt extract | 20 |
| | | $KH_2PO_4$ | 20 |
| Agar | 15 | Agar | 40 |

The manner in which the process of the invention may be carried out is described in further detail in the following examples:

EXAMPLE 1

In an inoculation tank containing a volume of 100 litres the following medium was prepared:

Ground corn: 15 kg.
$KNO_3$: 0.750 kg.
Bacterial Amylase Novo, 5000 SKB units/g. 7.5 g.
Water: about 60 litres.

This mixture was heated to 85° C. and kept at that temperature for about 30 minutes. The mixture was then boiled for 90 minutes at 120° C. under direct injection of steam, so that the final volume became 75 litres. After cooling to 30° C. the mixture was inoculated with spores of strain CBS 262.65 from a Fernbach flask containing Czapek Dox agar which had been incubated for 7 days at 30° C. Stirring (240 r.p.m.) and aeration (60 litres per minute) were started, and the fermentation was carried out for 27 hours until a good growth developed in the tank. The tank contents were then transferred to a main fermentation tank containing:

Ground corn: 240 kg.
$KNO_3$: 12 kg.
Bacterial Amylase Novo, 5000 SKB units/g.: 120 g.

The medium was prepared and sterilized in the same manner as the medium of the inoculation tank, and the final volume was 1200 litres.

Following the inoculation, stirring (350 r.p.m.) and aeration (1 cubic meter per minute) were started, and soya oil was added when necessary as an anti-foaming agent. At the beginning the pH was 5.65, which decreased to 4.2 to 4.3 during the fermentation. After 100 hours of fermentation the enzyme content (amyloglucosidase) had reached 500 NA/ml. (Novo-amyloglucosidase units per ml.), and under sterile conditions 35 kg. of corn starch in 80 litres of water were added. The suspension had been decomposed by means of 40 g. Bacterial Amylase Novo, 5000 SKB units/g. and sterilized for 90 minutes at 120° C. After 180 hours of fermentation the enzyme content was 750 NA/ml. The pH was 4.5, and the fermentation was stopped.

The mycelium was removed by filtration, and the resulting enzyme solution was a light, straw-yellow liquid with a mild acid taste. This enzyme solution was found free of transglucosidase.

EXAMPLE 2

In an inoculation tank with a volume of 100 litres a medium was prepared which consisted of:

Ground corn: 12 kg.
Bacterial Amylase Novo, 5000 SKB units/g.: 12 g.
$KNO_3$: 1 kg.
Water, about 60 litres.

This medium was prepared and sterilized as described in Example 1. After cooling to 30° C. the tank was inoculated with spores from the strain CBS 103.66. After 40 hours of growth under the same conditions as described in Example 1 the tank contents were transferred to a main fermentation tank which contained:

Corn starch: 60 kg.
Ground corn: 240 kg.
Bacterial Amylase Novo 5000 SKB units/g.: 0.3 kg.
$KNO_3$: 12 kg.

The medium was prepared and sterilized in the same way as the medium of the inoculation tank, and the final volume was 1200 litres.

After the inoculation, stirring (400 r.p.m.) and aeration (800 litres per minute) were started, and soya oil was added when necessary as an anti-foam agent.

The initial pH of the medium was 5.70 which decreased to 4.1 during the fermentation. After 146 hours the enzyme content was 1600 NA/ml.

The mycelium was removed by filtration and the resulting enzyme solution was a light straw-yellow liquid with a mild acid taste.

This enzyme solution was found free of transglucosidase.

EXAMPLE 3

In 500 ml. Erlenmeyer flasks 100 ml. portions of a medium with the following composition:

Ground corn: 200 g.
$KNO_3$: 10 g.
Bacterial Amylase Novo 5000 SKB units/g.: 0.4 g.
Water to make 1 litre, were sterilized. The flasks which were stoppered with cotton plugs, were inoculated with spores from a Czapek Dox agar slant of the strain CBS 263.65 and incubated on a rotary shaker (240 r.p.m.) for 6 days at 30° C. The mycelium was filtered off and the filtrate was found to contain 700 to 800 NA/ml. of amyloglucosidase. Transglucosidase was not detectable.

The NA unit referred to above is defined as the amount of enzyme which forms 1 mg. glucose under the conditions stated below. The amyloglucosidase content is determined by reacting the enzyme with bacterial amylase limit dextrin to form glucose which is then determined by means of glucoseoxidase.

Sample: 0.5 ml. enzyme solution+0.5 ml. dextrin substrate are left for 30 minutes at 37° C. 3 ml. GOD-reagent are then added, and the mixture is again left for 60 minutes, whereafter the OD (optical density) is determined at 420 m$\mu$.

Blank: 0.5 ml. enzyme solution+3 ml. GOD-reagent+0.5 ml. dextrin substrate are left at 37° C. for 60 minutes, whereupon the OD is determined at 420 m$\mu$ against 1 ml. water+3 ml. GOD-reagent.

Standard: 1 ml. glucose standard: 3 ml. GOD-reagent. After 60 minutes at 37° C. the OD is determined at 420 m$\mu$ against 1 ml. water+3 ml. GOD-reagent.

The reagents used in the determination of amyloglucosidase content are described in detail in the following paragraphs:

(1) Bacterial amylase limit dextrin 1 kg. potato starch is suspended in 4 liters of deionized water, and 10 g. Bacterial Amylase Novo, 5000 SKB units per g. are dissolved in 100 ml. water. 1 ml. is added to the starch, and the resulting mixture is heated to 75° C. for 10 minutes and cooled to 50° C. The rest of the amylase is added, and the mixture is left for 2 hours. After cooling to 30° C., 200 g. of yeast are added, and the mixture is fermented for 3 days. About 700 ml. are distilled off, pH is adjusted to 6 with N NaOH, and 10 g. amylase concentrate are added. The resulting mixture is heated to 50° C. for 2 hours and cooled to 30° C., whereafter 200 g. of yeast are added. Fermentation is carried out for 3 hours, and the mixture is then centrifuged, evaporated to 500 ml. residue and precipitated with 5 parts of acetone. In this manner there are obtained about 250 g. of powder DE 13.5.

(2) Dextrin substrate 2 g. bacterial amylase dextrin are suspended in 80 ml. of deionized water. The suspension is brought to boiling and cooled. 10 ml. N sodium acetate buffer are added, and pH is adjusted to 4.3, if desired by addition of acetic acid. The mixture is filled up to 100 ml. with deionized water.

(3) GOD-reagent 400 mg. glucoseoxidase (Sigma, crude)
10 mg. peroxidase (Sigma, crude)
1 ml. o-dianisidin solution
2 ml. Triton X-100 solution
Trisbuffer to make 200 ml.

The solution is filtered before use and stored in refrigerator.

(4) o-dianisidin (Sigma, crystalline)

0.5 M (pH 7.0). 61.0 g. tris (Sigma) are dissolved Stored in a brown flask in darkness at room temperature.

(5) Trisbuffer 0.5 m (pH 7.0). 61.0 g. tris (Sigma) are dissolved in 85 ml. 5 N hydrochloric acid. Deionized water is added to make 1 liter. pH is adjusted to 7.0, and 1 ml. chloroform is added. Stored at room temperature.

(6) Glucose standard 50 mg. glucose, anhydrous (M&B, Reagent Grade). Deionized water is added to make 1 liter.

(7) Triton X-100 solution 10 ml. Triton X-100+40 ml. 96 percent ethanol.

The amyloglucosidase solution which may be prepared by the present process has been analyzed for transglucosidase by adding 1 ml. enzyme solution (containing 10 NA) to 1 ml. of 6 percent pure maltose in 0.1 M acetate buffer (pH 4.5). The mixture was left for 1 hour at 37° C. and then boiled for 10 minutes. 6 portions of 5 $\mu$l. each were placed on a chromatographic paper which was developed until next day with butanol: pyridine:water in the proportions 6:4:3.

The paper was dried and the sugar spots made visible by dipping the paper in aniline:diphenylamine:phosphoric acid:ethanol in the proportions 0, 16:0, 16:0, 85:100 and drying at 100° C.

The presence of transglucosidase in the preparation will result in the formation of isomaltose or higher oligosaccharides which on the chromatogram will appear between the starting point and the maltose spot. When no spots appear at this place it is concluded that the preparation is free of transglucosidase.

What I claim is:

1. In a process for producing amyloglucosidase by subjecting *Aspergillus niger* to submerged growth in a nutrient medium, the improvement wherein the amyloglucosidase so produced is free of detectable amounts of transglucosidase and which comprises employing a strain of *Aspergillus niger* v. Tieghem selected from the group CBS No. 262.65, CBS No. 263.65 and CBS No. 103.66 or a natural or artificial mutant or variant thereof.

2. In the process of claim 1, the use of the *Aspergillus niger* v. Tieghem strain CBS No. 262.65.

3. In the process of claim 1, the use of the *Aspergillus niger* v. Tieghem strain CBS No. 263.65.

4. In the process of claim 1, the use of the *Aspergillus niger* v. Tieghem strain CBS No. 103.66.

References Cited

UNITED STATES PATENTS

| | | | |
|---|---|---|---|
| 3,012,944 | 12/1961 | Armbruster | 195—31 |
| 3,249,514 | 5/1966 | Bode | 195—66 |
| 3,301,768 | 1/1967 | Smiley | 195—66 |

LIONEL M. SHAPIRO, Primary Examiner

UNITED STATES PATENT OFFICE
CERTIFICATE OF CORRECTION

Patent No. 3,677,902                    Dated July 18, 1972

Inventor(s) Knud Aunstrup

It is certified that error appears in the above-identified patent and that said Letters Patent are hereby corrected as shown below:

In Column 6, line 6, change

"0.5 m (pH 7.0).61.09. tris (Sigma) are dissolved"

to read

--0.5 g is dissolved in 50 ml 96 per cent ethanol--

In Column 6, line 26 change

"4.5" to --4.6--

Signed and sealed this 1st day of May 1973.

(SEAL)
Attest:

EDWARD M. FLETCHER, JR.          ROBERT GOTTSCHALK
Attesting Officer                Commissioner of Patents